United States Patent [19]
Rodick

[11] Patent Number: 5,025,944
[45] Date of Patent: Jun. 25, 1991

[54] OUTLET ASSEMBLY FOR MOUNTING TO A WALL STUD

[76] Inventor: Steven F. Rodick, 10917 Indian Trail, Dallas, Tex. 75229

[21] Appl. No.: 600,131

[22] Filed: Oct. 19, 1990

Related U.S. Application Data

[63] Continuation of Ser. No. 56,226, Jun. 1, 1987, abandoned.

[51] Int. Cl.⁵ .................................... F16M 13/00
[52] U.S. Cl. ................................. 220/3.9; 220/3.3
[58] Field of Search ............................ 220/3.3, 3.9

[56] References Cited

U.S. PATENT DOCUMENTS

| | | | |
|---|---|---|---|
| 2,644,600 | 7/1953 | Senif | 220/3.9 |
| 2,934,590 | 4/1960 | Thompson et al. | 174/53 |
| 3,588,019 | 6/1971 | Cozeck et al. | 220/3.9 X |
| 3,730,466 | 5/1973 | Swanquist | 220/3.9 X |
| 3,780,209 | 12/1973 | Schuplin | 220/3.9 X |
| 3,977,640 | 8/1976 | Arnold et al. | 220/3.9 X |
| 4,135,337 | 1/1979 | Medlin | 220/3.3 X |
| 4,140,293 | 2/1979 | Hansen | 220/3.9 |
| 4,240,688 | 12/1980 | Sotolongo | 339/122 F |
| 4,303,296 | 12/1981 | Spaulding | 339/122 R |
| 4,399,922 | 8/1983 | Horsley | 220/3.3 X |
| 4,470,656 | 9/1984 | Moser et al. | 339/122 F |
| 4,533,060 | 8/1985 | Medlin | 220/3.3 X |
| 4,572,391 | 2/1986 | Medlin | 220/3.9 |

Primary Examiner—Steven M. Pollard
Attorney, Agent, or Firm—Hubbard, Thurman Tucker & Harris

[57] ABSTRACT

An outlet assembly is disclosed for mounting electrical communication interface equipment and wiring to a wall stud. A pair of electrical receptacles are spot welded at their side portions to leg members formed contiguously at a ninety degree angle to a connecting member. The connecting member spaces the receptacles apart a sufficient distance to permit placement of the receptacles adjacent either side of the wall stud, and further automatically adjusts the depth of the front surface of the wall stud from the front face of the receptacles to an appropriate distance without the need for taking measurements. The assembly is secured by screws or other fastening means through the connecting member to the front surface of the wall stud.

9 Claims, 1 Drawing Sheet

OUTLET ASSEMBLY FOR MOUNTING TO A WALL STUD

This application is a continuation of application Ser. No. 056,226, filed June 1, 1987 now abandoned.

BACKGROUND OF THE INVENTION

The present invention relates generally to electrical outlet apparatus, and more particularly provides a unique outlet assembly for mounting electrical and communications interface equipment and wiring to a wall stud.

The art of installing electrical wiring, telephone lines and other telecommunication equipment on a large scale has become a labor intensive task. Modern office buildings as well as homes rely heavily on power equipment, communication devices and other appliances which requires the installation of additional service equipment. Electrical technicians generally install electrical receptacles and communication junction boxes during the construction of a building according to the desired user's specifications. Typically, electrical receptacles are secured in compliance with National Electric Code standards to the studs or wall supports of the building. Each receptacle, whether used for an electrical outlet, computer interface or telephone line, must be individually secured to the stud representing a time consuming task. Typically, the receptacle is secured to the stud by nails or screws. It is common that a pair of receptacles are mounted on the stud, one on each side thereof. The installation process requires that the receptacle be oriented at the appropriate depth along the stud so as to be flush with the exterior sheet rock or plaster subsequentially applied to the wall. Measurements must therefore be carefully made for the installation of each receptacle unit. Usually, four screws are required to mount each receptacle on each side of the stud, after measurements are made for appropriate depth, angle and placement. Because of the level of training and sophistication required for compliance with NEC standards, this laborious task is usually performed by highly paid electricians adding a significant cost to construction.

While various forms of electrical receptacles are available commercially, the problem of facilitating installation thereof has heretofore been unresolved. It is not inconceivable that in an average building, several thousand electrical receptacles must be installed within the interior walls of the structure. It is accordingly an object of the present invention to provide an outlet assembly which eliminates or substantially minimizes the procedures and time required for installation typically associated with outlet assemblies of conventional construction and operation.

SUMMARY OF THE INVENTION

The present invention provides a convenient outlet assembly for mounting electrical and communications interface equipment and wiring to a wall stud and comprises at least one receptacle secured to connection means along a side portion thereof. The side portions of the receptacles may be spot welded to the connection means to either the connecting member itself or leg members which are contiguously formed at a ninety degree angle to the connecting member. The connecting member may then be secured by screws to the front surface of the wall stud, such that the depth of the wall stud from the front face of the receptacles is automatically determined without the need for measurement prior to installation. The receptacles are automatically adjusted for desired placement on either side of the wall stud.

The outlet assembly permits fastening of receptacles to the wall stud from a forward position, on the front surface of the wall stud as opposed to the conventional manner of securing the receptacle to the side of the wall stud. Installation and also subsequent removal of the receptacles is thereby greatly facilitated.

In a preferred embodiment of the present invention, leg members of the connection means are spot welded to side portions of the receptacles such that upon installation, the front face of each receptacle is extended $\frac{1}{2}$ inch from the front surface of wall stud 16, in accordance with the National Electric Code Standards in allowing for appropriate application of plaster or sheet rock in forming the wall structure. The connecting member having apertures therein for retaining screws is placed against the front surface of the wall stud, thereby automatically positioning the receptacles adjacent either side of the wall stud and extending the receptacles as previously described from the front surface. The assembly may therefore be quickly fastened by a minimum of screws without the need for taking measurements.

Compared to electrical outlets of conventional construction and installation, the present outlet assembly provides several distinct advantages. First, its simple construction renders it easy and relatively inexpensive to manufacture. Additionally, the outlet assembly uniquely solves the problem of laborious measurement and inaccuracies associated therewith commonly occurring during installation of standard electrical receptacles. The present invention permits fastening of receptacles directly to the front of the wall stud, a task which is much easier to perform than that of securing the receptacles to the side surfaces of the wall stud. In addition, the present invention permits installation of at least two receptacles in less time and with less effort than as has been previously required with the installation of a single receptacle under conventional procedures.

In alternative embodiments, the connection means may be oriented by spot welding side portions to either the connecting member or the leg members in an appropriate fashion to obtain the desired depth between the front face of the receptacles and the front surface of the wall stud. Any conventional or custom made electrical receptacle may be adapted for use in conjunction with the outlet assembly of the present invention.

DETAILED DESCRIPTION

Figure 1:
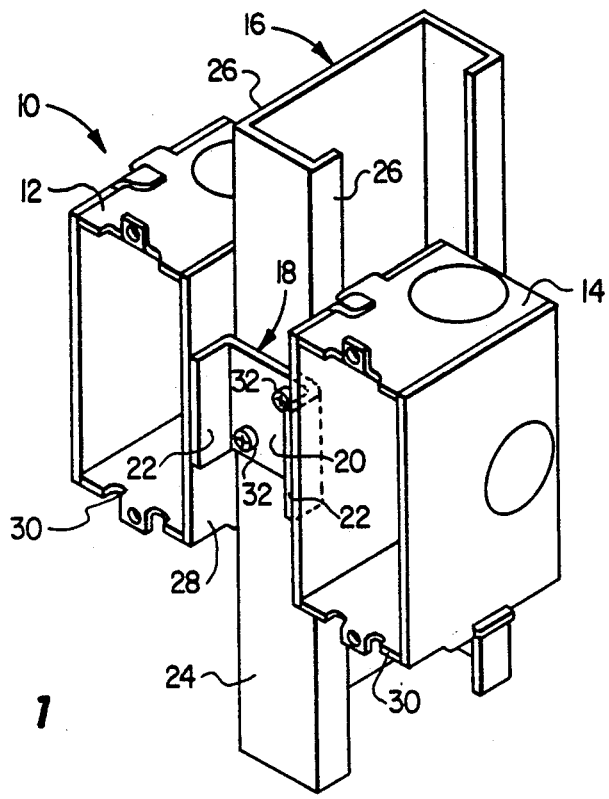
FIG. 1 is a perspective view of the outlet assembly which embodies principals of the present invention as adapted to position and secure two electrical receptacles to a wall stud.

Perspectively illustrated in FIG. 1 is an outlet assembly 10 which embodies principles of the present invention and is utilized to position and secure electrical receptacles 12 and 14 to wall stud 16. The assembly 10 is particularly well adapted to electrical wiring and telecommunications applications and is uniquely constructed to permit efficient installation without the need for precision measurements.

Figure 2:
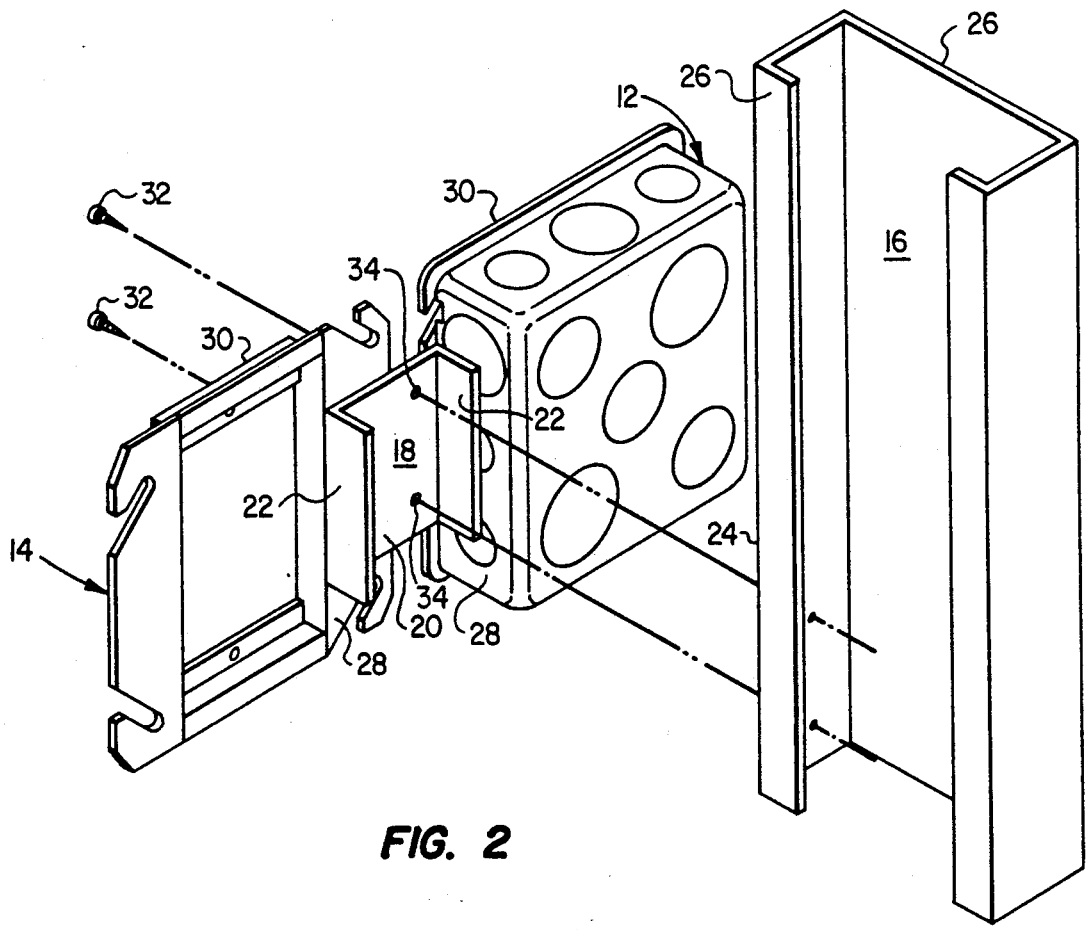
FIG. 2 is an enlarged, exploded rear perspective view of the outlet assembly of the present invention as adapted to position and secure two alternative types of electrical receptacles to a wall stud.

As seen in FIGS. 1-2, the outlet assembly 10 comprises connection means 18 which interconnects receptacles 12 and 14. Connection means 18 includes a connecting member 20 having contiguously formed therewith leg members 22 oriented at a ninety degree angle with respect to the connecting member 20. The connection means 18 may be constructed of any suitably rigid material, but in the preferred embodiment is composed of 18-gauge galvanized steel. The connecting member is typically one and five-eighths (1⅝) inches across, corresponding to the width of the front surface 24 of wall stud 16. This width may vary depending upon the size of stud to which assembly 10 is to be attached, so that receptacles 12 and 14 fit snuggly adjacent side surfaces 26 of wall stud 16. Leg members 22 are typically one-half (½) inch in length as they protrude from the connecting member 20. The side portions 28 of the receptacles are spot welded or otherwise secured to leg members 22, or as seen in FIG. 2, may be secured to connecting member 20 itself. The position of leg members 22 with reference to side portion 28 of receptacles 12 and 14 determine the extent to which receptacles 12 and 14 extend away from front surface 24 of wall stud 16. This dimension is somewhat crucial in virtually all applications since it is important to maintain the front face 30 of receptacles 12 and 14 at a consistent level away from the stud. Front faces 30 eventually becomes integral with the finished wall after application of sheet rock and/or plaster. According to NEC regulations including Section 370-10, the front face 30 of the receptacles must be maintained at a distance of one-half (½) inch from front surface 24 of wall stud 16. Once connection means 18 is spot welded to side portions 28, the desired depth is automatically determined as outlet assembly 10 is secured to wall stud 16. This eliminates the laborious task of measuring and positioning each receptacle 12 or 14 for individual attachment, and likewise provides accuracy and uniformity in the resulting finished wall since front faces 30 cannot be inadvertently misaligned.

Instead of taking multiple measurements to accurately secure each receptacle 12 and 14 to wall stud 16, outlet assembly 10 is simply placed against wall stud 16 such that connecting member 20 rests against front surface 24 of wall stud 16. Front faces 30 of each receptacle is thereby automatically positioned one-half (½) inch (or other desired distance) away from front surface 24 to permit compliance with code regulations and proper application of wall board or plastering. Each receptacle 12 and 14 is also positioned against the side surfaces 26 of wall stud 16 because of the selected length of connecting member 20. In most applications, the wall stud and hence the connecting member 20 is one and five-eights (1⅝) inches across. It is contemplated that differing sizes of connecting member 20 may be used according to the particular application. Once connecting member 20 is placed against wall stud 16, screws 32 may be fastened through apertures 34 to snuggly secure assembly 10 to wall stud 16. An additional advantage of the present invention is that easy removal of receptacles 12 and 14 is possible at a later time since the assembly 10 is secured from the front at front surface 24 for easy access, instead of along the side surfaces 26 as in conventional applications.

Receptacles 12 and 14 may consist of any type of standard electrical boxes having side and rear knockouts commonly marketed through most electric supply distributors. Various forms of receptacles are contemplated, including gangable switch boxes, 4-inch square boxes, plaster rings, raised surface covers, handy boxes, octagonal boxes, other device covers and all other boxes designed to be installed in studded walls. Such boxes would include telephone and telecommunication boxes commonly available or custom designed for particular applications. For example, in FIG. 1, receptacles 12 and 14 consist of standard handy boxes used for housing electrical plugs and switches, while in FIG. 2 receptacles 12 and 14 consist of four inch square box usually used for household wiring and a plaster ring which may be used for electrical applications or telephone and telecommunications interface. It is contemplated that any number of receptacles may be connected to the connecting means 18, according to the desired application.

In order to provide an accurate elevation of front face 30 away from front surface 24 of the wall stud 16, the side portions 28 may be welded or fastened to connection means 18 in any desired position. For example, as shown in FIG. 1, side portions 28 are spot welded to leg members 22, such that leg members 22 protrude away from front surface 24 placing front face 30 at the desired distance away from wall stud 16. Alternatively, as shown in FIG. 2, connection means 18 is oriented such that leg members 22 extend towards front surface 24 and side portions 28 are spot welded on one side to leg member 22 and on the other side to connection means 18 itself to achieve the desired elevation of each front face 30 away from front surface 24.

As shown in FIGS. 1-2, wall stud 16 is constructed of metal having an interior hollow area. It is contemplated that any form of wall stud may be used, such that wall 16 may be composed of solid wood, metal, or other material and may be of any desired dimension.

It can be seen from the foregoing that the present invention provides an outlet assembly which is of a simple, reliable and relatively inexpensive construction and is readily adaptable to a wide variety of electrical and communications interface equipment mounting applications. Due to the automatic positioning of front faces 30 in an elevated relation away from front surface 24 of wall stud 16, tedious measurements are no longer required to quickly install various electrical receptacles. The connecting member 20 is of a specified length thereby permitting adjustment of the distance between receptacle 12 and receptacle 14 such that each receptacle when mounted rests adjacent the side surfaces 26 of wall stud 16. Outlet assembly 10 is secured easily from the front into front surface 24 by screws 32 through apertures 34 without the need for measurements as in the conventional procedure.

The foregoing detail description is to be clearly understood as being given by way of illustration and example only, the spirit and scope of the present invention being limited solely by the appended claims.

What is claimed is:

1. An outlet assembly for mounting electrical and communications interface equipment and wiring to a wall stud having contiguous front and side surfaces, comprising:
   a pair of receptacles having a front face and a side portion;
   a mounting bracket for securing said receptacles to said wall stud, said mounting bracket including a mounting plate and two leg members contiguous with and substantially perpendicular to said mounting plate;

each of said leg members being secured to a side portion of a receptacle so that said mounting plate extends laterally outwardly from a side portion of each receptacle; and said leg members extending away from said mounting plate toward the front face of the receptacles and having a distal edge; whereby upon attachment of a leg member to the side portion of a receptacle, said mounting plate is positioned a predetermined distance rearwardly of said front face of the receptacle, said mounting plate being securable to said front surface of said wall stud to automatically position the front face of said receptacle said predetermined distance forwardly of said front surface of said wall stud.

2. An outlet assembly according to claim 1 wherein:

said mounting bracket comprises first and second leg members spaced apart at opposite ends of said mounting plate, said first and second leg members being secured to the side portions of first and second receptacles; whereby said mounting plate extends between said side portions of said first and second receptacles to form a connection therebetween such that said first and second receptacles are positionable along opposing side surfaces of said wall stud as said mounting plate is secured to said front surface of said wall stud, automatically positioning said front faces of said first and second receptacles said predetermined distance forwardly of said front surface of said wall stud.

3. An outlet assembly according to claim 1 wherein: said mounting plate is securable to said front surface of said wall stud by threaded fasteners.

4. The apparatus according to claim 1 wherein:

said leg members are secured to the side surfaces of said receptacles by spot welding.

5. An outlet assembly for mounting electrical and communications interface equipment and wiring to a wall stud having contiguous front and side surfaces, comprising:

a first receptacle comprising a box member and a front plate member removably secured to said box member, said box member having side portions and a back portion;

a second receptacle having only a front plate member;

a mounting bracket including a mounting plate and at least one leg member contiguous with and substantially perpendicular to said mounting plate;

said at least one leg member being secured to said side portion of said box member of said first receptacle, and said mounting plate being secured to said front plate member of said second receptacle; whereby said mounting plate extends between said first and second receptacles to form a connection therebetween such that said receptacles are positionable along opposing side surfaces of said wall stud as said mounting plate is secured to said front surface of said wall stud automatically positioning said front plate member of said first and second receptacles a predetermined distance forwardly of said front surface of said wall stud.

6. An outlet assembly according to claim 5 wherein: said leg member is secured to said side portion of the box member of said first receptacle by spot welding.

7. An outlet assembly according to claim 5 wherein: said mounting plate is secured to said front plate member of said second receptacle by spot welding.

8. An outlet assembly according to claim 5 wherein: said front plate member of said first receptacle is secured to said box member by threaded fasteners.

9. An outlet assembly accordint to claim 5 wherein: said mounting plate is secured to said front surface of said wall stud by threaded fasteners.

* * * * *